United States Patent [19]

Fink

[11] Patent Number: 4,604,029

[45] Date of Patent: Aug. 5, 1986

[54] COMPRESSED-AIR VIBRATOR WITH TURBINE DRIVE

[75] Inventor: Willy Fink, Waltalingen, Switzerland

[73] Assignee: Findeva AG, Oerlingen, Switzerland

[21] Appl. No.: 591,766

[22] Filed: Mar. 21, 1984

[30] Foreign Application Priority Data

Apr. 20, 1983 [CH] Switzerland ........................ 2128/83

[51] Int. Cl.[4] ........................ F01D 1/36; F16H 33/00

[52] U.S. Cl. ...................................... 415/92; 415/202; 366/124; 74/87

[58] Field of Search .................. 415/90, 92, 202, 503, 415/203, 212 R; 366/124–126, 128; 74/61, 87; 173/49; 198/770; 209/366, 366.5; 310/81

[56] References Cited

U.S. PATENT DOCUMENTS

| | | | |
|---|---|---|---|
| 516,729 | 3/1894 | Byrd | 415/202 X |
| 1,346,221 | 7/1920 | Liedtke | 366/124 |
| 2,875,988 | 3/1959 | Wysong | 366/124 |
| 2,960,316 | 11/1960 | McKellar | 366/124 |
| 3,188,054 | 6/1965 | Mason, Jr. | 366/128 X |
| 3,202,402 | 8/1965 | Giertz-Hedstrom | 366/128 X |
| 4,027,995 | 6/1977 | Berry | 415/92 |

FOREIGN PATENT DOCUMENTS

| | | | |
|---|---|---|---|
| 2434397 | 6/1975 | Fed. Rep. of Germany | 415/92 |
| 2706220 | 8/1978 | Fed. Rep. of Germany | 366/124 |

*Primary Examiner*—Robert E. Garrett
*Assistant Examiner*—Joseph M. Pitko
*Attorney, Agent, or Firm*—Scully, Scott, Murphy & Presser

[57] ABSTRACT

A compressed-air vibrator with a turbine drive, which includes an unbalanced cylindrical rotor, an essentially closed housing having a cylindrical chamber in which the rotor is rotatably supported, with an inlet opening on the housing for the inlet of compressed air into the chamber, and with a discharge opening for the egress of air from the chamber. The rotor is constituted of at least two segments which possess different specific weights to provide the necessary imbalance.

4 Claims, 4 Drawing Figures

II
1
3
4
25
26
7
15
30
11
14
8
18
20
23
22
24
21
19
II

I
5
1
3
4
25
6
22
15
24
23
14
22
I 2
9
IV
16
17
23
IV 2
17
9

COMPRESSED-AIR VIBRATOR WITH TURBINE DRIVE

BACKGROUND OF THE INVENTION

1. Field of the Invention

The present invention relates to a compressed-air vibrator with a turbine drive, which includes an unbalanced cylindrical rotor, an essentially closed housing having a cylindrical chamber in which the rotor is rotatably supported, with an inlet opening on the housing for the inlet of compressed air into the chamber, and with a discharge opening for the egress of air from the chamber.

2. Discussion of the Prior Art

Compressed-air vibrators of that type are employed, for example, for the compacting of pulverulent or granular material, or also for the loosening of pulverulent material in filling and dosing or metering facilities. For instance, compressed-air vibrators of this type are disclosed in U.S. Pat. Nos. 3,870,232 and 3,932,057. In these vibrators, an unbalanced rotor is placed into rotation within a housing having compressed air passing therethrough, so as to thereby generate the desired vibration. In order to impart the desired imbalance to the rotor, the latter is provided with bores which are filled with a specific heavier metal such as, for example, steel or lead. Ribs or fins are arranged on the cylindrical surface of the rotor, against which there impacts the inflowing air and thereby rotates the rotor. The rotors are supported on a central shaft by means of small, internally-supported ball bearings. These bearings have a relatively short service life inasmuch as they are too weak with regard to the high imbalancing force which is produced. The known vibrators also generate a considerable amount of noise during their operation, which frequently lies above legally permissible noise levels.

SUMMARY OF THE INVENTION

Accordingly, it is an object of the present invention to provide a vibrator of the above-mentioned construction which, at favorable and competitive manufacturing costs, evidences a long service life, and generates a low noise level during its operation.

The foregoing object is achieved through the intermediary of a vibrator which incorporates the features of the compressed-air vibrator as set forth hereinabove, and in which the rotor is constituted of at least two segments which possess different specific weights.

BRIEF DESCRIPTION OF THE DRAWINGS

Reference may now be had to the following detailed description of a preferred embodiment of a vibrator constructed pursuant to the invention, taken in conjunction with the accompanying drawings; in which.

DETAILED DESCRIPTION

Figures 1, 2, 3, 4:
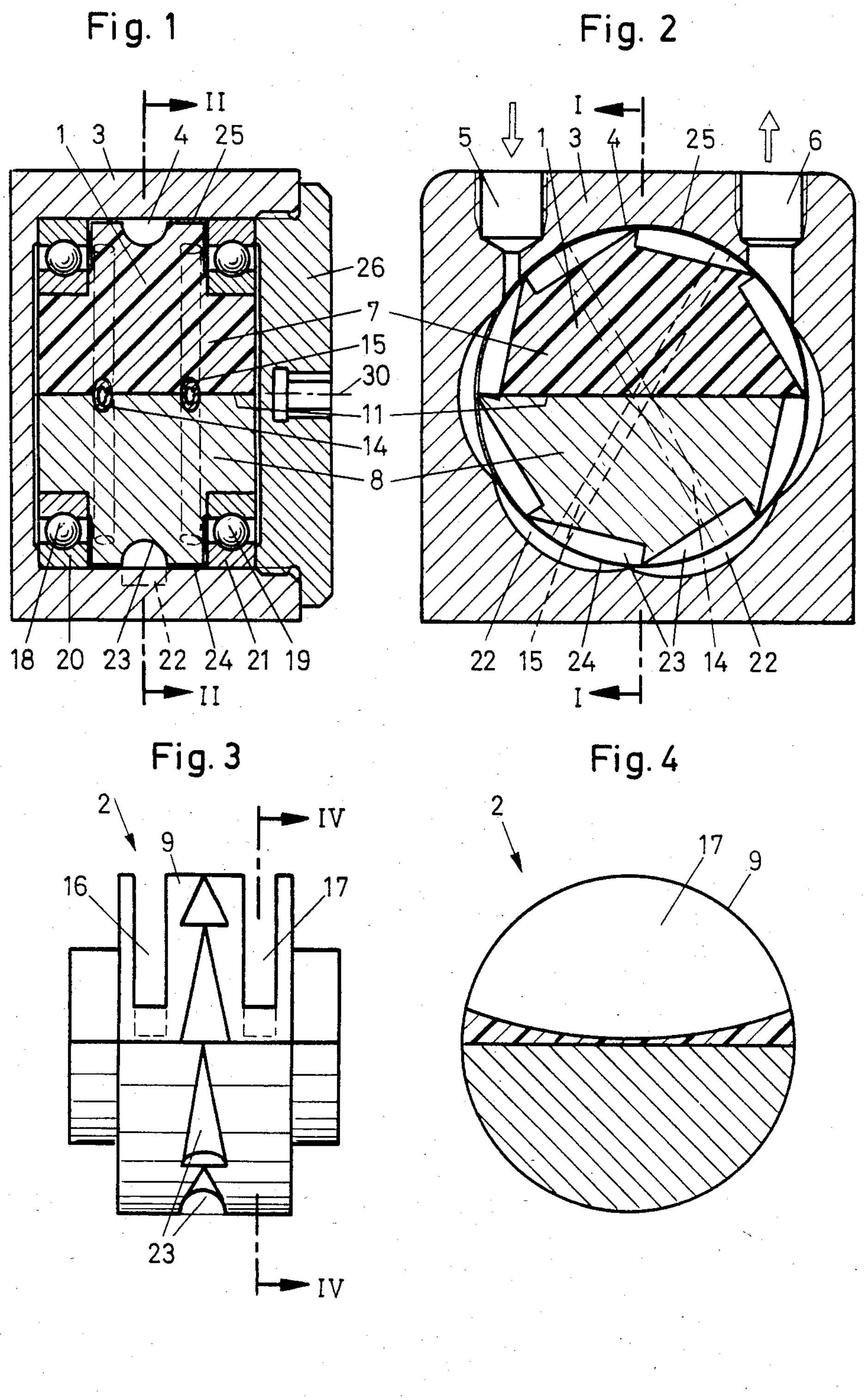
FIG. 1 illustrates a longitudinal sectional through a vibrator, taken along line I—I in FIG. 2.
FIG. 2 is a transverse cross-sectional view through a vibrator, taken along line II—II in FIG. 1.
FIG. 3 is an end view of a rotor.
FIG. 4 is a transverse cross-sectional view through a rotor, taken along line IV—IV in FIG. 3.

FIGS. 1 and 2 of the drawings illustrate a compressed-air vibrator including a cylindrical housing 3 with a housing bore 25, into the threaded opening of which there is screwed a cover 26. Supported within the thereby formed cylindrical chamber 4 is a rotor 1 by means of two externally-supported ball bearings 18 and 19. The outer races 20 and 21 of the ball bearings 18 and 19 are fitted with a slight play into the housing bore 25, so as to enable the rings 20 and 21 to slowly rotate within the housing 3 during the rotational movement of the rotor 1. Thereby, forces which act on the ball bearings 18 and 19, and which are generated in particular during resonance vibrations, are uniformly distributed over the entire circumference of the outer races 20 and 21. By means of this measure, there is significantly increased the service life of the ball bearings 18 and 19.

The rotor 1 consists of two segments 7 or 9 (as shown in FIGS. 3 and 4) and 8 which are interconnected by means of spring cotter pins 14 and 15. When the segments are constituted of adhesible materials, then these can also be glued together by means of a suitable adhesive, for example, Araldit. Cotter pins will then, as a rule, become superfluous. The segments 7 and 8 each form, respectively, one-half of the cylindrical rotor 1, whereby the rotational axis 30 of the rotor lies along the contact surface 11 between the two segments. One of the segments 7 or 8 consists of a material having a comparatively high specific weight, such as for example, brass; whereas the other segments consists of a material having a relatively low specific weight, for example a plastic material or a comparatively specific lightweight metal, such as for instance, aluminum. In the embodiment of FIGS. 3 and 4 showing a modified rotor 2, the light-weight segment 9 is provided with recesses 16 and 17 to further reduce the weight thereof.

A plurality of pockets 23 are worked generally centrally into the cylindrical outer surface 24 of the rotor, into which there engages compressed air streaming in through the inlet opening 5, and which sets the rotor into rotational movement. In comparison with the usual small-toothed rotors, this rotor produces a relatively low noise level at a high degree of efficiency.

A plurality of radial pockets 22 are worked into the cylindrical surface of the chamber 4 intermediate the inlet opening 5 and the discharge opening 6. Practical experiments have indicated that, by means of the radial pockets 22, there is increased the acceleration of the rotational movement. The length of the radial pockets 22, viewed in the direction of rotation of the rotor 1, is preferably greater than the length of the pockets 23 on the rotor 1, so that at each position of the rotor 1, the compressed air can flow from one radial pocket into an adjoining pocket. During starting, a plurality of pockets 23 on the rotor 1 are simultaneously supplied with compressed air so as to enable the rotor to be started with a relatively low air pressure. This is of particular importance with rotors possessing a high imbalance.

What is claimed is:

1. In a compressed-air vibrator with a turbine drive, including an unbalanced cylindrical rotor, a closed housing having a cylindrical chamber, said rotor being rotatably supported within said chamber, an inlet opening in said housing for the inlet of compressed air into said chamber, and a discharge opening in said housing for the exit of air from said chamber; the improvement comprising in that said rotor is constituted of at least two segments of differing specific weights, at least one said segment being constituted of metal and at least one said segment being constituted of a plastic material, each said segment forming respectfully one-half of said rotor, the rotational axis of said rotor being located to extend along the contact surface between said two segments.

2. In a compressed-air vibrator with a turbine drive, including an unbalanced cylindrical rotor, a closed housing having a cylindrical chamber, said rotor being rotatably supported within said chamber, an inlet opening in said housing for the inlet of compressed air into said chamber, and a discharge opening in said housing for the exit of air from said chamber; the improvement comprising in that said rotor is constituted of at least two segments of differing specific weights, said segments being constituted of metal, each said segment forming respectfully one-half of said rotor, the rotational axis of said rotor being located to extend along the contact surface between said two segments.

3. Compressed-air vibrator as claimed in claim 1 or 2, comprising spring cotter pins interconnecting said segments.

4. Compressed-air vibrator as claimed in claim 1 or 2, wherein both of said segments are glued together.

* * * * *